United States Patent
Liu et al.

(10) Patent No.: US 10,686,641 B2
(45) Date of Patent: Jun. 16, 2020

(54) SIGNALING AND FEEDBACK SCHEMES OF TIME-VARY CHANNELS IN HIGH-EFFICIENCY WLAN

(71) Applicant: MEDIATEK INC., Hsinchu (TW)

(72) Inventors: Jianhan Liu, San Jose, CA (US);
Chih-Kai Chen, Milpitas, CA (US);
Tianyu Wu, Fremont, CA (US);
Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 63 days.

(21) Appl. No.: 15/342,299

(22) Filed: Nov. 3, 2016

(65) Prior Publication Data

US 2017/0134207 A1     May 11, 2017

Related U.S. Application Data

(60) Provisional application No. 62/251,539, filed on Nov. 5, 2015.

(51) Int. Cl.
*H04L 27/26*          (2006.01)
*H04L 25/02*          (2006.01)
(Continued)

(52) U.S. Cl.
CPC ....... *H04L 27/2695* (2013.01); *H04B 7/0626* (2013.01); *H04B 7/0689* (2013.01); *H04B 17/318* (2015.01); *H04L 1/0026* (2013.01); *H04L 5/0048* (2013.01); *H04L 25/022* (2013.01); *H04L 25/023* (2013.01); *H04L 25/0222* (2013.01); *H04L 25/03057* (2013.01);
(Continued)

(58) Field of Classification Search
CPC ............... H04L 27/2695; H04L 5/0048; H04L 25/03057; H04L 27/2602; H04B 17/318; H04W 84/12; H04W 88/08
See application file for complete search history.

(56) References Cited

U.S. PATENT DOCUMENTS

| | | | |
|---|---|---|---|
| 7,126,533 B2 | 10/2006 | Fiore et al. | |
| 8,213,527 B2 | 7/2012 | Wang et al. | ................... 375/267 |

(Continued)

FOREIGN PATENT DOCUMENTS

| | | |
|---|---|---|
| CN | 102149192 | 8/2011 |
| EP | 3098999 | 11/2016 |

(Continued)

OTHER PUBLICATIONS

EPO, Search Report for the EP patent application 16197315.1 dated Mar. 31, 2017 (8 pages).

(Continued)

*Primary Examiner* — Oussama Roudani

(57) ABSTRACT

Signaling and feedback schemes of channel variation information from WLAN receiver are proposed. WLAN receiver performs channel tracking and obtains channel variation information. The signaling and feedback of channel variation information can help WLAN transmitter to decide when to apply travelling pilots or mid-amble in the transmission. Furthermore, the channel variation information can assist WLAN transmitter for scheduling the next transmission properly and thereby enhancing the system performance of WLAN.

18 Claims, 4 Drawing Sheets

(51) Int. Cl.
  *H04L 1/00* (2006.01)
  *H04B 7/06* (2006.01)
  *H04B 17/318* (2015.01)
  *H04L 5/00* (2006.01)
  *H04L 25/03* (2006.01)
  *H04W 84/12* (2009.01)
  *H04W 88/08* (2009.01)

(52) U.S. Cl.
  CPC .......... *H04L 27/2602* (2013.01); *H04L 27/26* (2013.01); *H04W 84/12* (2013.01); *H04W 88/08* (2013.01)

(56) References Cited

U.S. PATENT DOCUMENTS

| | | | |
|---|---|---|---|
| 8,619,641 B2 | 12/2013 | Guo | |
| 8,929,192 B2 | 1/2015 | Kainulainen et al. | |
| 9,615,214 B2 | 4/2017 | Syrjarinne et al. | |
| 9,647,868 B2 | 5/2017 | Jiao et al. | |
| 2001/0006540 A1* | 7/2001 | Kim | H04L 25/0214 375/340 |
| 2006/0158374 A1 | 7/2006 | Rahamin et al. | |
| 2008/0191941 A1 | 8/2008 | Saban et al. | |
| 2008/0232485 A1 | 9/2008 | Niu et al. | |
| 2009/0040998 A1 | 2/2009 | Park | |
| 2009/0122890 A1 | 5/2009 | Wu | |
| 2010/0246720 A1* | 9/2010 | Wang | H04L 1/0015 375/316 |
| 2011/0033004 A1 | 2/2011 | Wang et al. | |
| 2011/0193739 A1 | 8/2011 | Strauch et al. | |
| 2011/0243197 A1* | 10/2011 | Atarashi | H04B 1/692 375/146 |
| 2011/0261858 A1 | 10/2011 | Baldemair et al. | |
| 2011/0274003 A1* | 11/2011 | Pare, Jr. | H04B 7/0452 370/252 |
| 2012/0258669 A1 | 10/2012 | Honkanen et al. | |
| 2012/0263211 A1 | 10/2012 | Porat et al. | |
| 2013/0070701 A1 | 3/2013 | Merlin et al. | |
| 2013/0089121 A1 | 4/2013 | Koo et al. | |
| 2013/0121244 A1 | 5/2013 | Vermani et al. | |
| 2013/0265907 A1 | 10/2013 | Kim et al. | |
| 2013/0321209 A1 | 12/2013 | Kalliola et al. | |
| 2013/0343211 A1 | 12/2013 | Liu et al. | |
| 2014/0070996 A1 | 3/2014 | Kneckt et al. | |
| 2014/0093005 A1* | 4/2014 | Xia | H04B 7/0617 375/267 |
| 2014/0219449 A1* | 8/2014 | Shattil | H04L 5/0007 380/270 |
| 2014/0247818 A1* | 9/2014 | Lopez | H04B 7/0617 370/337 |
| 2014/0254648 A1* | 9/2014 | Van Nee | H04B 7/0413 375/224 |
| 2014/0328335 A1 | 11/2014 | Zhang | |
| 2015/0023449 A1 | 1/2015 | Porat et al. | |
| 2015/0117329 A1* | 4/2015 | Avudainayagam | H04B 7/0617 370/329 |
| 2015/0124739 A1 | 5/2015 | Baik et al. | |
| 2015/0139091 A1 | 5/2015 | Azizi et al. | |
| 2015/0139115 A1 | 5/2015 | Seok | |
| 2015/0230231 A1 | 8/2015 | Fornoles, Jr. | |
| 2015/0256246 A1* | 9/2015 | Ishihara | H04B 7/0615 375/267 |
| 2015/0296516 A1 | 10/2015 | Jung | |
| 2016/0021568 A1 | 1/2016 | Yu et al. | |
| 2016/0033614 A1 | 2/2016 | Wang et al. | |
| 2016/0047885 A1 | 2/2016 | Wang et al. | |
| 2016/0065467 A1 | 3/2016 | Wu et al. | |
| 2016/0248542 A1 | 8/2016 | Liu et al. | |
| 2016/0249165 A1 | 8/2016 | Aldana | |
| 2016/0323060 A1 | 11/2016 | Hassanin et al. | |
| 2016/0330055 A1 | 11/2016 | Tong | |
| 2016/0352552 A1 | 12/2016 | Liu et al. | |
| 2016/0366548 A1 | 12/2016 | Wang et al. | |
| 2016/0370450 A1 | 12/2016 | Thorn et al. | |
| 2017/0064718 A1 | 3/2017 | Bharadwaj et al. | |
| 2017/0070893 A1 | 3/2017 | Wang et al. | |
| 2017/0070998 A1 | 3/2017 | Wu et al. | |
| 2017/0093546 A1 | 3/2017 | Wu et al. | |
| 2017/0099089 A1 | 4/2017 | Liu et al. | |
| 2017/0104553 A1 | 4/2017 | Liu et al. | |
| 2017/0171363 A1 | 6/2017 | Sun et al. | |
| 2017/0171796 A1 | 6/2017 | Wu et al. | |
| 2017/0180177 A1 | 6/2017 | Wu et al. | |
| 2017/0214507 A1* | 7/2017 | Kang | H04B 7/065 |
| 2017/0215087 A1 | 7/2017 | Amizur et al. | |
| 2017/0230220 A1 | 8/2017 | Anwyl et al. | |
| 2017/0230981 A1 | 8/2017 | Ryu et al. | |
| 2018/0013527 A1 | 1/2018 | Sun et al. | |

FOREIGN PATENT DOCUMENTS

| | | |
|---|---|---|
| WO | 2004049498 | 6/2004 |
| WO | 2010022785 | 3/2010 |
| WO | WO2015069811 A1 | 11/2013 |
| WO | 2015077042 | 5/2015 |
| WO | 2016049216 A2 | 3/2016 |
| WO | 2016154350 A1 | 9/2016 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

Darryn Lowe et al., "Analysis and Evaluation of MB-OFDM Dual Carrier Modulation", Telecommunicatins Information Technology Research Institute, University of Wollongong.
EPO, Search Report for the EP Patent Application 15833049.8 dated Feb. 16, 2018 (9 pages).
International Search Report and Written Opinion of International Search Authority for PCT/CN20151087365 dated Nov. 24, 2015 (10 Pages).
EPO, Search Report for The EP Patent Application 16191047.6 dated Feb. 14, 2017 (7 Pages).
Young Hoon Kwon, Newracom, SIG Field Design Principle for 11AZ, DOC.: IEEE 802.11-15/0344R2, Mar. 2015 *Slides 5-14*.
EPO, Search Report for The EP Patent Application 16193438.5 dated Mar. 17, 2017 (9 Pages).
EPO, Search Report for The EP Patent Application 16187569.5 dated Jan. 23, 2017 (12 Pages).
Robert Stacey, Intel, Specification Framework for TGAX, IEEE P802.11 Wireless LANS, Jul. 2015 *p. 3, Line 25-39*, * p. 4, Line 1-5*, *Sections 3.2.2, 3.2.3, 3.3.2, 4.1*.
Katsuo Yunoki, Kddi R&D Laboratories, Considerations on HE-SIG-NB, Doc.: IEEE 802.11-15/827R2, Jul. 2015 *Slides 2-11*.
Joonsuk Kim, Apple, HE-SIG-B Structure, Doc.: IEEE 802.11-15/0821R2, Jul. 2015 *Slides 8-15*.
Joonsuk Kim, et al., HE-SIG-B Structure, Doc.: IEEE 802.11-15/0821R2, Sep. 2015 *Slides 11-15*.
EPO, Search Report for The EP Patent Application 16187569.5 dated Nov. 9, 2017(6 Pages).
Kaushik Josiam et al., HE-SIG-B Contents, Doc.: IEEE802.11-15/1066R0, Sep. 2015, *Slide 8* Slides 10, 11* *Slide 17*.
M. Rahaim et al, Wife PHY Standards Review—From Early 802.11 to 'AC' and 'AD', MCL Technical Report No. Apr. 29, 2014.
Robert Stacey, Intel, Specification Framework for TGAX, IEEE P802.11 Wireless LANS, Doc.: IEEE 802.11-15/0132R8, Sep. 2015. Paragraph [3.2.4]*.
Tim Schmidt, "Clause 6 OFDM PHY Draft", Jan. 2010 IEEE P802.15-10-0013-00-004G, IEEE P802.15 Wireless Personal Area Networks, Progect IEEE P802.15 Working Group for Wireless Personal Area Networks (WPANS).

* cited by examiner

SIGNALING AND FEEDBACK SCHEMES OF TIME-VARY CHANNELS IN HIGH-EFFICIENCY WLAN

CROSS REFERENCE TO RELATED APPLICATIONS

This application claims priority under 35 U.S.C. § 119 from U.S. Provisional Application No. 62/251,539, entitled "Signaling and Feedback Schemes of Time-Varying Channels in High Efficiency WLAN," filed on Nov. 5, 2015, the subject matter of which is incorporated herein by reference.

TECHNICAL FIELD

The disclosed embodiments relate generally to wireless network communications, and, more particularly, to signaling and feedback of time-varying channels in wireless communications systems.

BACKGROUND

IEEE 802.11 is a set of standards for implementing wireless local area network (WLAN) communication in the 2.4, 3.6, 5, and 60 GHz frequency bands. Within the IEEE 802.11 standards, IEEE 802.11ac covers very high throughput with potential improvements over IEEE 802.11n, IEEE 802.11ah covers Sub 1 GHz sensor network and smart metering, and upcoming IEEE 802.11ax considers the improvement of spectrum efficiency to enhance the system throughput in high-density scenarios of wireless devices and will become a successor to IEEE 802.11ac.

When WLAN is deployed in the outdoor scenarios, stations (STAs) can experience time-varying channel conditions. Time varying channels are mainly caused by Doppler effect, due to movement of STAs or the fast-moving objects around STAs. In a first scenario, speed up to 3 kilometers per hour (kmph) for all clusters for UMi and Uma model. In a second scenario, the second and third clusters of UMi and UMa models assigned a speed of 60 kmph and the rest of the clusters assigned 3 kmph.

Channel variation is an important feature of channel condition and should be feedback for enhancing the system performance of WLAN. In wireless communications systems, travelling pilots or mid-amble can be used to combat time-varying channels by enabling channel tracking. For backward compatibility and simplicity, however, traveling pilots or mid-amble may not be applied for every packet. Furthermore, there is no existing mechanism for feedback the channel variation information. As a result, the transmitter has no knowledge about the time-varying channel condition of each receiver.

Signaling and feedback schemes of channel variation information from WLAN receiver can help WLAN transmitter to decide when to apply travelling pilots or mid-amble in the transmission. The information of channel variation needs to be obtained by the receiver, and then fed back to the transmitter to assist various decision making for the next transmission and thereby enhancing the system performance of WLAN.

SUMMARY

Signaling and feedback schemes of channel variation information from WLAN receiver are proposed. WLAN receiver performs channel tracking and obtains channel variation information. The signaling and feedback of channel variation information can help WLAN transmitter to decide when to apply travelling pilots or mid-amble in the transmission. Furthermore, the channel variation information can assist WLAN transmitter for scheduling the next transmission properly and thereby enhancing the system performance of WLAN.

In one embodiment, a wireless station (STA) tracks channel variation of a wireless channel in an OFDM communication network. The STA measures pilots and estimates the wireless channel at multiple OFDM symbols. The STA determines a channel variation metric based on the channel estimation at the multiple OFDM symbols. The STA inserts a channel variation indicator based on the channel variation metric into a radio frame. The STA transmits the radio frame to an access point (AP) of the OFDM communication network.

In another embodiment, an access point (AP) receives a channel variation indicator from a wireless station (STA) in an OFDM communication network. The AP determines whether a wireless channel of the wireless STA is time-varying within a predefined time difference based on the channel variation indicator. The AP schedule a subsequent data transmission for the wireless STA based on whether the wireless channel is time-varying.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
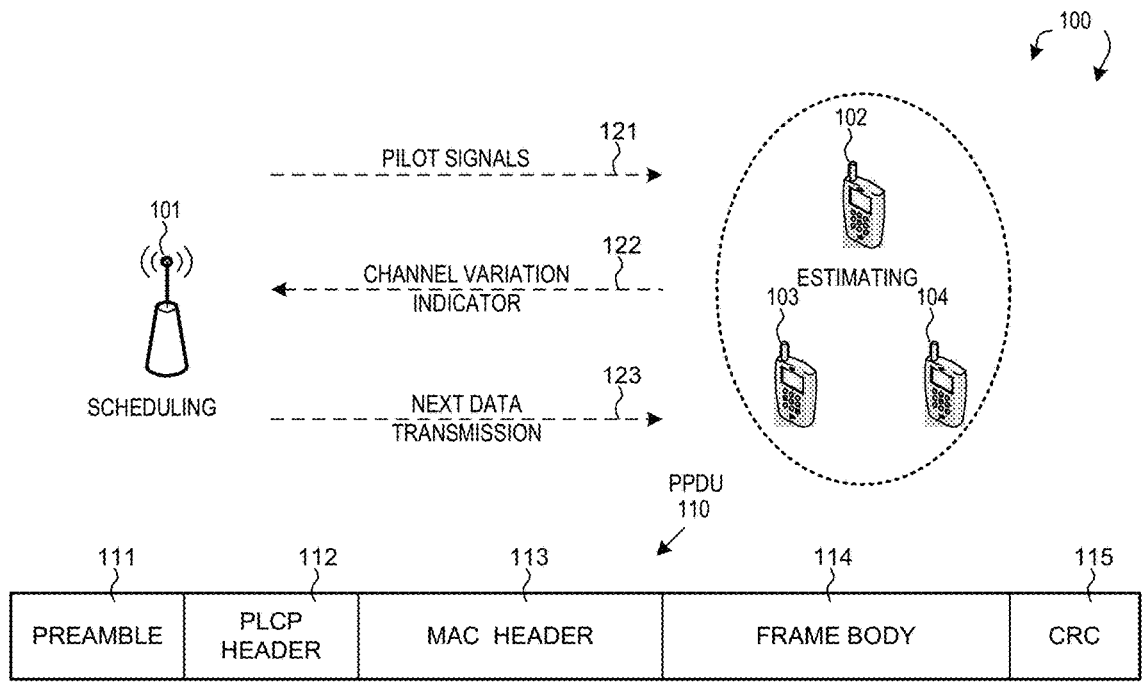
FIG. 1 illustrates a wireless communications system with channel variation feedback in accordance with a novel aspect.

FIG. 1 illustrates a wireless communications system 100 with channel variation feedback in accordance with a novel aspect. Wireless local area network WLAN 100 comprises a wireless access point AP 101 and a plurality of wireless stations STAs 102-104. In wireless communications systems, wireless devices communicate with each other through various well-defined frame structures. In general, each IEEE 802.11 frame is a Physical Layer Convergence Procedure (PLCP) Protocol Data Unit (PPDU). Frames are in turn divided into very specific and standardized sections. In the example FIG. 1, PPDU 110 comprises a Preamble 111, a Physical Layer Convergence Procedure (PLCP) header 112, and a MAC layer Protocol Data Unit (MPDU), which further comprises a MAC header 113, a frame body of payload/data 114, and a CRC field 115.

When WLAN is deployed in the outdoor scenarios, stations (STAs) can experience time-varying channel conditions. Time varying channels are mainly caused by Doppler effect, due to movement of STAs or the fast-moving objects around STAs. Channel variation is an important feature of channel condition and should be feedback for enhancing the system performance of WLAN. In wireless communications systems, travelling pilots or mid-amble can be used to combat time-varying channels by enabling channel tracking. However, there is no existing mechanism for feedback the channel variation information. As a result, the transmitter has no knowledge about the time-varying channel condition of the receiver.

In accordance with one novel aspect, signaling and feedback schemes of channel variation information from WLAN receiver are proposed. WLAN receiver performs channel tracking and obtains channel variation information. The signaling and feedback of channel variation information can help WLAN transmitter to decide when to apply travelling pilots or mid-amble in the transmission. Furthermore, the channel variation information can assist WLAN transmitter for scheduling the next transmission properly and thereby enhancing the performance of WLAN.

In the example of FIG. 1, AP 101 transmits pilot signals to STA 102, STA 103, and STA 104 (step 121). The pilot signals can be used by the STAs to track channel variations. The pilots can be located in fixed position of specific OFDM symbols, or can be traveling pilots. If AP 101 already has the knowledge that a specific STA has a time-varying channel, then AP 101 can transmit traveling pilots to that specific STA such that the channel tracking can be performed more accurately. Upon receiving the pilot signals, the STAs can measure the pilots and then perform channel estimation accordingly. The STAs can also estimate channel variation using the data symbols by re-modulating sliced output of demodulated signals. The STAs then determines channel variation information from the estimated channel and derives a channel variation indicator to be feedback to AP 101 (step 122). Upon receiving the channel variation indicator, AP 101 determines which STA has time-varying channel accordingly. As a result, AP 101 can schedule the next data transmission accordingly. For example, if STA 102 has a time-varying channel, then AP 101 can 1) exclude STA 102 from being grouped together with other STAs for MU-MIMO transmission; 2) does not apply beamforming on data transmission intended for STA 102; 3) link adaptation for MCS selection is more conservative for STA 102; and 4) only send short packets to STA 102 to avoid channel varying effect.

Figure 2:
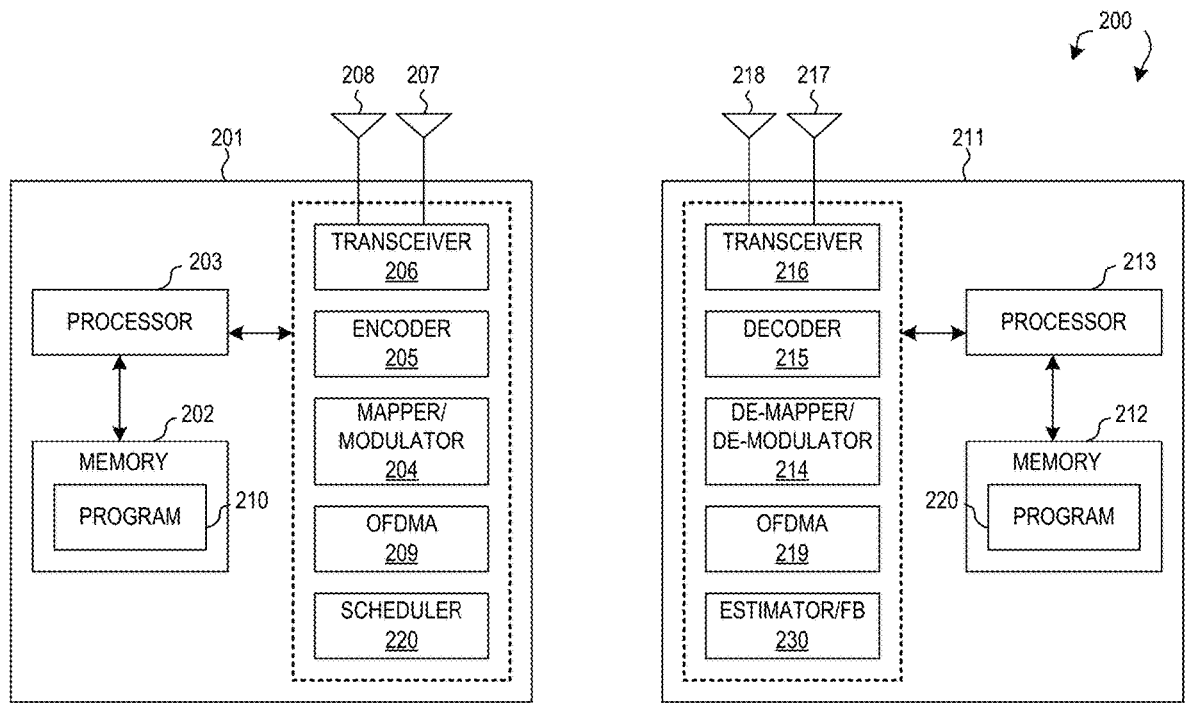
FIG. 2 is a simplified block diagram of a wireless transmitting device and a receiving device in accordance with embodiments of the current invention.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, an OFDMA module 209, and a scheduler 220. Wireless device 211 is a receiving device that includes a decoder 215, a symbol de-mapper/de-modulator 214, a OFDMA module 219, and an estimator/feedback circuit 230. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, at the transmitter side, device 201 encodes data packets embedded with pilot signals and transmits to the receiver. At the receiver side, device 211 performs channel tracking and estimates the wireless channel based on the pilot signals. Device 211 then generates a radio frame, and inserts channel variation indicator in the radio frame. Device 211 then feedback the radio frame to the transmitter. At the transmitter side, device 201 receives the radio frame, and decodes channel variation indicator. If the channel variation indicator indicates that the wireless channel of the receiver is time-varying, then it schedules the subsequent data transmission accordingly. Various embodiments of such transmitting device and receiving device are now described below with accompany drawings.

Figure 3:
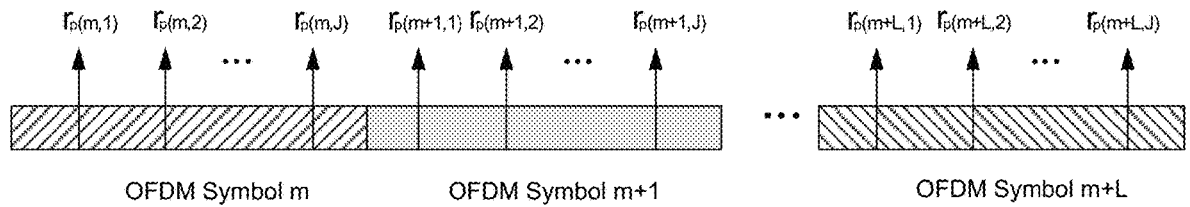
FIG. 3 illustrates embodiments of obtaining channel variation information.

FIG. 3 illustrates various embodiments of obtaining channel variation information. There are different methods of obtaining channel variation information. In general, channel variation information can be acquired at STAs by one of the following methods. In a first method, pilot-based schemes are used. In a second method, decision feedback equalization (DFE)-based schemes are used. In a third method, receives signal strength indicator (RSSI)-based schemes for constant modulus modulated subcarriers are used.

For pilot-based schemes, the STAs use pilots to track channel variations. Pilots are inserted in certain subcarriers of data OFDM symbols for the channel estimation of those subcarriers. There are two type of pilots: a first type of pilots is called fixed pilots and a second type of pilots is called traveling pilots. Fixed pilots are located in fixed subcarriers in different OFDM symbols. Travelling pilots are an optional feature used to improve channel estimation under higher Doppler scenarios. Travelling pilots are located in "travelling" subcarriers in different OFDM symbols. By defining different subcarrier positions for different OFDM symbols, channel estimation can be performed over more subcarriers for improved performance.

In the example of FIG. 3, $r_p(m, j)$ represents received signal of the j-th pilot in the m-th OFDM symbol and J is the total number of pilots used in an OFDM symbol. The channel estimation using $r_p(m, j)$ can be written as:

$$\hat{H}(m,j) = r_p(m,j)p^*(m,j) \quad (1)$$

Where
$r_p(m, j)$ represents received signal of the j-th pilot in the m-th OFDM symbol
p(m, j) is the training pilot signal, and p(m, j) is BPSK typically modulated
$p^*(m, j)$ is the conjugate of p(m, j)

If the received packet contains travelling pilots or midamble, then STA continuously update the channel estimation based on the travelling pilots. If the received packet contains fixed pilots, then STA evaluate the channel variation based on the fixed pilots. The metric of channel variations can be defined based on the estimated channels. In the following example, metric of channel variation $Q_H(L)$ can be defined as the normalized difference of channel estimations between L OFDM symbols:

$$Q_H(L) = \sum_{m=1,j=1}^{M,J} \frac{\|\hat{H}(m, j) - \hat{H}(m+L, j)\|^2}{\|\hat{H}(m, j)\|^2} \quad (2)$$

For DFE-based schemes, channel estimation for k-th subcarrier of m-th OFDM symbol is:

$$\hat{H}(m,k) = r(m,k)\hat{s}^*(m,k) \quad (3)$$

Where
$\hat{s}^*(m, k)$ is the conjugate of the re-modulated signal based on the decoded bits.
Metric of channel variation $Q_H(L)$ is defined as the normalized different of channel estimation between L OFDM symbols as depicted by equation (2).

For RSSI-based schemes for constant modulus modulated subcarriers, the metric of channel variation can also be defined as the energy difference of constant modulus modulated subcarriers, such as BPSK modulated fixed positioned pilots:

$$Q_H(L) = \sum_{m=1,j=1}^{M,J} \frac{\|r(m, j)\|^2 - \|r(m+L, j)\|^2}{\|r(m, j)\|^2} \quad (4)$$

In general, the metric of channel variation is used to quantize the channel varying information. In a first example, the metric of channel variation $M_H(\tau)$ is defined based on Square Error as depicted in the following equation (5). In a second example, the metric of channel variation $R_H(\tau)$ is defined based on Correlation as depicted in the following equation (6). $R_H(\tau)$ just takes the channel variation of the image parts.

$$M_H(\tau) = \sum_{k,m} \frac{\|\hat{H}(m+kT) - \hat{H}(m+kT+\tau T)\|^2}{\|\hat{H}(m+kT)\|^2} \quad (5)$$

-continued $$R_H(\tau) = \sum_{k,m} \left( \frac{Im(\hat{H}(m+kT)\hat{H}^*(m+kT+\tau T))}{\|\hat{H}(m+kT)\|^2} \right) \quad (6)$$

Figure 4:
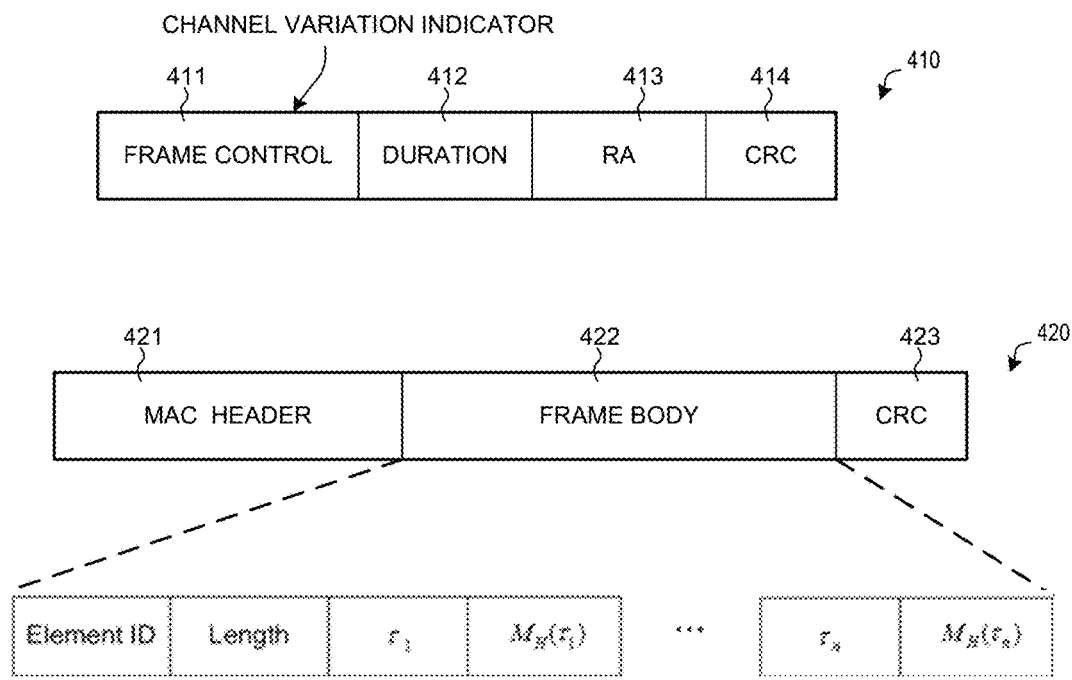
FIG. 4 illustrates embodiments of providing channel variation feedback.

Where
m is the subcarrier index
T is the OFDM symbol duration with CP
k is the OFDM symbol index
$\tau$ is the time distance in OFDM symbols FIG. 4 illustrates various embodiments of providing channel variation feedback. In a first embodiment, an immediate feedback of channel variation can be provided from STA to AP via a channel variation indicator inserted in a signaling (SIG) field of the preamble of a frame or in the MAC header of a frame. The channel variation indicator can also be inserted in an ACK or Block ACK (BA) frame as depicted by frame 410. ACK/BA frame 410 comprises frame control 411, duration 412, RA 413, and CRC 414. The channel variation indicator can be overloaded in the frame control field. In one example, the channel variation indicator is a one-bit indication, which simply indicates whether the channel is time-varying or not. It can also be used as a request bit for travelling pilots. In another example, the channel variation indicator is a two-bit indication, indicating four states of time-varying condition of the channel. At the receiver (AP) side, the receiver (AP) can determine the channel variation condition by comparing with certain threshold. For example, if the channel variation indicator is set to "1", then it indicates that the channel is time-varying and that the channel variation metric M is higher than a threshold. On the other hand, if the channel variation indicator is set to "0", then it indicates that the channel is not time-varying and that the channel variation metric M is lower than a threshold.

In a second embodiment, a channel variation information element (IE) can be provided from STA to AP via a management frame 420. Management frame 420 comprises MAC header 421, frame body 422, and CRC 423. Frame body 422 further comprises the channel variation IE including an element ID field identifying the IE, a length field identifying the length of the IE, and one or multiple channel variation metric fields. For example, each channel vibration metric field comprises a time distance in OFDM symbols ($\tau$n) followed by a corresponding quantized channel variation metric $M_H(\tau n)$.

Figure 5:
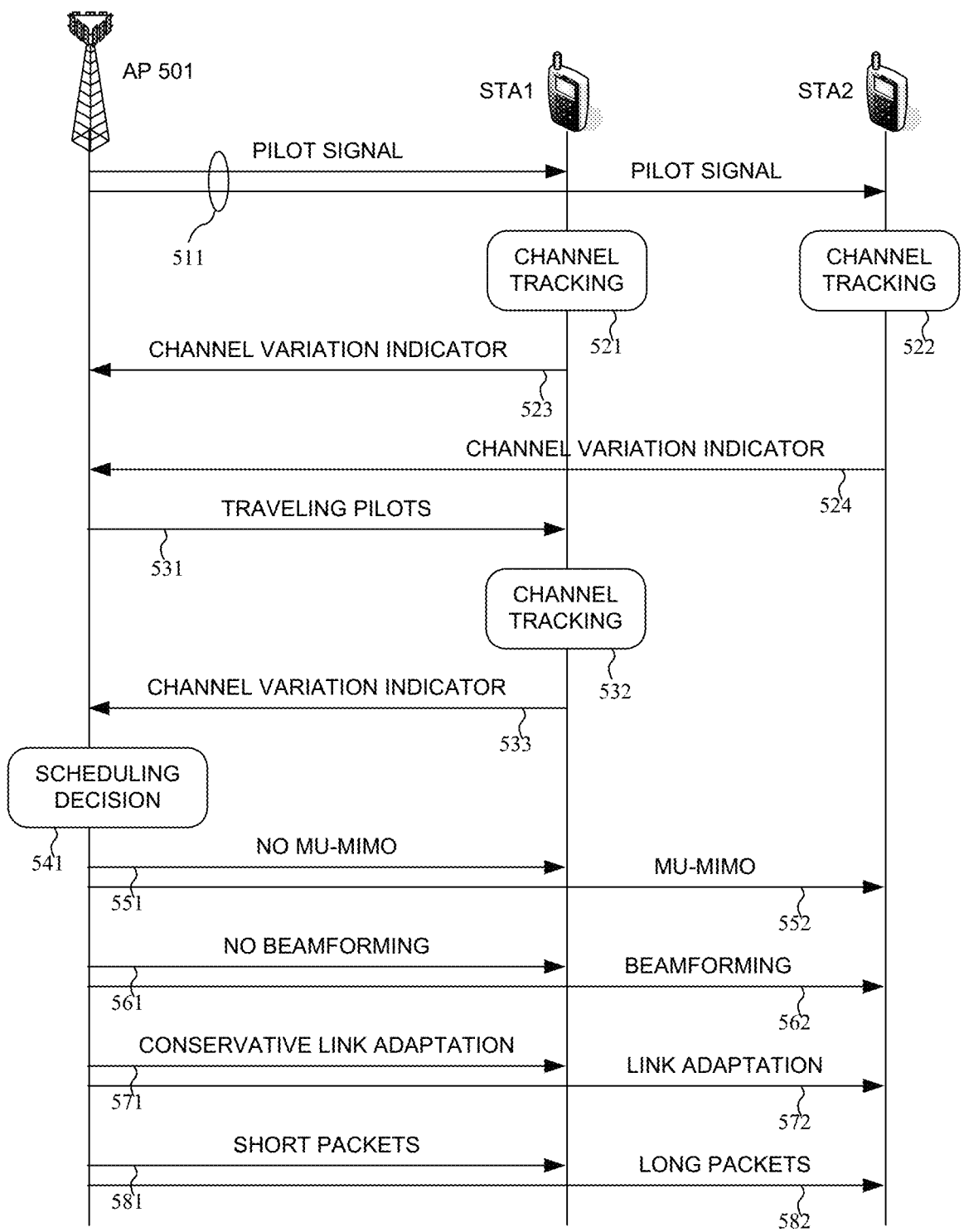
FIG. 5 is a sequence flow between a transmitting device and one or more receiving devices, where the receiving devices obtain channel varying information and provide channel variation feedback to the transmitting device, such that the transmitting device can make subsequence scheduling decision based on the channel variation feedback.

FIG. 5 is a sequence flow between a transmitting device AP 501 and two receiving devices STA1 and STA2, where the receiving devices obtain channel varying information and provide channel variation feedback to the transmitting device, such that the transmitting device can make subsequence scheduling decision based on the feedback. In step 511, AP 501 transmits pilot signals to wireless stations STA1 and STA2 in the basic service set (BSS). The pilot signals may be fixed pilots or traveling pilots located in fixed or travelling subcarriers of different OFDM symbols. In step 521, STA1 performs channel tracking by measuring and estimating the channel over the pilots. Similarly, in step 522, STA2 performs channel tracking by measuring and estimating the channel over the pilots. Note that the STA does not need to perform channel tracking using data packets intended for itself. The STA can perform channel tracking based on received packets intended for other STAs.

In step 523, STA1 transmits channel variation indicator to AP 501. In step 524, STA2 transmits channel variation indicator to AP 501. Based on the channel variation feedback, AP 501 determines whether STA1 and STA2 has a time-varying channel or not. In one example, AP 501 determines that STA1 is a fast-moving STA and has a time-varying channel caused by Doppler effect. In step 531, AP 501 transmits data packets embedded with traveling pilots (or mid-amble) to STA1. In step 532, STA1 continuously update the channel estimation based on the travelling pilots or mid-amble to obtain improved channel estimation. In step 533, STA1 determines updated channel variation metric and transmits updated channel variation indicator to AP 501. On the other hand, AP 501 determines that STA2 has a static non-time-varying channel and continue to use fixed pilots for channel tracking. In general, avoid using travelling pilots or mid-amble in static channel can reduce complexity and power consumption. Furthermore, if there are more travelling pilots than fixed pilots, then using fixed pilots in static channel can enhance spectrum efficiency.

In step 541, AP 501 makes scheduling decision based on the received channel variation feedback. In one example, AP 501 determines that STA1 has a time-varying channel while STA2 has a static non-time-varying channel. As a result, AP 501 can make the following scheduling decisions accordingly. In a first scenario, AP 501 excludes STA1 from MU-MIMO grouping (step 551) while schedules STA2 for MU-MIMO with other STAs having static channels (step 552) for the next data transmission. In a second scenario, AP 501 does not apply beamforming for STA1 (step 561) while applies beamforming for STA2 (step 562) for the next data transmission. In a third scenario, AP 501 applies normal link adaptation for MCS selection for STA2 (step 572) while applies a more conservative link adaptation for MCS selection for STA1 (step 571). In a fourth scenario, AP 501 schedules only short data packets to be transmitted to STA1 (step 581) while schedules long data packets to be transmitted to STA2 (step 582) for the next data transmission. Note the different scheduling decisions are not mutually exclusive, which can be made separately or combined in the same data transmission.

Figure 6:
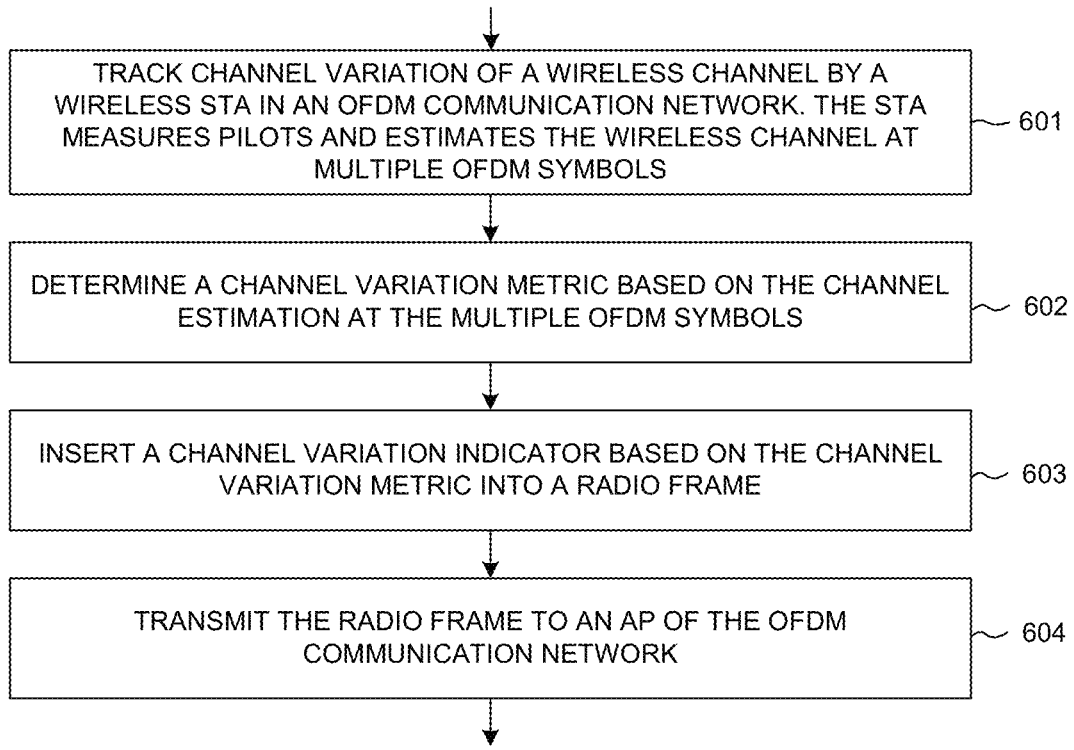
FIG. 6 is flow chart of a method of obtaining channel variation information and providing channel variation feedback in accordance with a novel aspect.

FIG. 6 is flow chart of a method of obtaining channel variation information and providing channel variation feedback in accordance with a novel aspect. In step 601, a wireless station (STA) tracks channel variation of a wireless channel in an OFDM communication network. The STA measures pilots and estimates the wireless channel at multiple OFDM symbols. In step 602, the STA determines a channel variation metric based on the channel estimation at the multiple OFDM symbols. In step 603, the STA inserts a channel variation indicator based on the channel variation metric into a radio frame. In step 604, the STA transmits the radio frame to an access point (AP) of the OFDM communication network.

Figure 7:
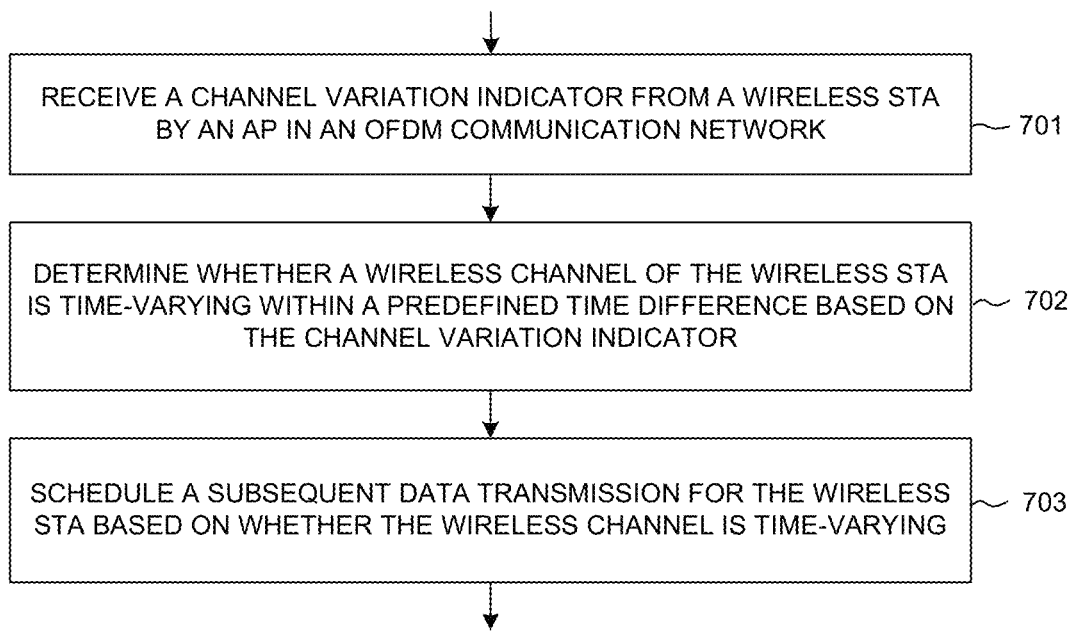
FIG. 7 is a flow chart of a method of receiving channel variation feedback and scheduling data transmission in accordance with one novel aspect.

FIG. 7 is a flow chart of a method of receiving channel variation feedback and scheduling data transmission in accordance with one novel aspect. In step 701, an access point (AP) receives a channel variation indicator from a wireless station (STA) in an OFDM communication network. In step 702, the AP determines whether a wireless channel of the wireless STA is time-varying within a predefined time difference based on the channel variation indicator. In step 703, the AP schedule a subsequent data transmission for the wireless STA based on whether the wireless channel is time-varying.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
tracking channel variation of a wireless channel by wireless station (STA) in an orthogonal frequency division multiplexing (OFDM) communication network, wherein the STA measures pilots and determines estimations of the wireless channel at multiple OFDM symbols;
determining a channel variation metric based on the channel estimations at the multiple OFDM symbols and inserting a channel variation indicator based on the channel variation metric into a radio frame, wherein the channel estimations are based on a decision feedback equalization (DFE)-based scheme, and the channel variation metric is defined as a normalized channel estimation difference between the multiple OFDM symbols;
scheduling a subsequent data transmission for the wireless STA using non-beam forming when the wireless channel is time-varying;
scheduling a subsequent data transmission for the wireless STA using beam forming when the wireless channel is statically non-time varying; and
transmitting the radio frame to an access point (AP) of the OFDM communication network.

2. The method of claim 1, wherein the pilots are one of fixed position pilots and traveling pilots.

3. The method of claim 1, wherein a second group of channel estimations are based on a pilot-based scheme, and the channel variation metric is defined as a normalized channel estimation difference between the multiple OFDM symbols.

4. The method of claim 1, wherein a second group of channel estimations are based on a received signal strength indicator (RSSI)-based scheme, and the channel variation metric is defined as an energy difference of constant modulus modulated subcarrier between the multiple OFDM symbols.

5. The method of claim 1, wherein the channel variation indicator indicates whether the wireless channel is time-varying within a time difference.

6. The method of claim 1, wherein the channel variation indicator indicates a quantized value of the channel variation metric within a time difference.

7. The method of claim 1, wherein the radio timeframe is one of an acknowledgment frame, a failure report action frame, and a management frame.

8. A wireless station (STA), comprising:
a receiver operable to receive pilots and to track channel variation of a wireless channel in an orthogonal frequency division multiplexing (OFDM) communication network, wherein the STA is operable to measure pilots and to estimate the wireless channel at multiple OFDM symbols to generate estimations;
a channel estimator that is operable to determine a channel variation metric based on the channel estimations at the multiple OFDM symbols and to insert a channel variation indicator based on the determined channel variation metric into a radio frame, wherein the channel estimations are based on a decision feedback equalization (DFE)-based scheme, and the channel variation metric is defined as a normalized channel estimation difference between the multiple OFDM symbols;
a scheduler operable to schedule a subsequent data transmission for the STA using non-beam forming when the wireless channel is time-varying and operable to schedule a subsequent data transmission for the STA using beam forming when the wireless channel is statically non-time varying;

a transmitter that is operable to transmit the radio frame to an access point (AP) of the OFDM communication network.

9. The wireless STA of claim 8, wherein the pilots are fixed one of position pilots and traveling pilots.

10. The wireless STA of claim 8, wherein a second group of channel estimations are based on a pilot-based scheme, and the channel variation metric is defined as a normalized channel estimation difference between the multiple OFDM symbols.

11. The wireless STA of claim 8, wherein a second group of channel estimations are based on a received signal strength indicator (RSSI)-based scheme, and the channel variation metric is defined as a normalized channel estimation difference between the multiple OFDM symbols.

12. The wireless STA of claim 8, wherein the channel variation indicator indicates whether the wireless channel is time-varying within a time difference.

13. The wireless STA of claim 8, wherein the channel variation indicator indicates a quantized value of the channel variation metric within a time difference.

14. The wireless STA of claim 8, wherein the radio frame is an acknowledgment frame, a failure report action frame, and a management frame.

15. A method, comprising:
receiving a channel variation indicator from a wireless station (STA) by an access point (AP) in an orthogonal frequency division multiplexing (OFDM) communication network, wherein the STA determines if a wireless channel of the STA is time varying by determining estimations of the wireless channel at multiple OFDM symbols and sets the channel variation indicator accordingly, and wherein the channel variation indicator indicates a quantized value of a channel variation metric;

the AP determining whether a wireless channel of the wireless STA is time-varying within a predefined time difference based on a value of the channel variation indicator;

scheduling a subsequent data transmission for the STA using non-beam forming when the wireless channel is time-varying;

scheduling a subsequent data transmission for the STA using beam forming when the wireless channel is statically non-time varying; and transmitting the subsequent data transmission for receipt by the STA based on the value of the channel variation indicator.

16. The method of claim 15, wherein the transmitting comprises the AP excluding the wireless STA from a multi-user multiple input multiple output (MU-MIMO) group if the wireless channel is time-varying.

17. The method of claim 15, wherein the transmitting comprises the AP not applying fast link adaptation if the wireless channel is time-varying.

18. The method of claim 15, wherein the transmitting comprises the AP scheduling short data packets for the wireless STA if the wireless channel is time-varying.

* * * * *